US012579555B2

(12) United States Patent
Jones et al.

(10) Patent No.: US 12,579,555 B2
(45) Date of Patent: Mar. 17, 2026

(54) SYSTEMS AND METHODS OF AUDIENCE EXPANSION USING DEEP AUTOENCODERS

(71) Applicant: Zeta Global Corp, New York, NY (US)

(72) Inventors: Zachary D Jones, Atlata, GA (US); Danny Portman, Atlanta, GA (US)

(73) Assignee: Zeta Global Corp., New York, NY (US)

( * ) Notice: Subject to any disclaimer, the term of this patent is extended or adjusted under 35 U.S.C. 154(b) by 80 days.

(21) Appl. No.: 17/364,835

(22) Filed: Jun. 30, 2021

(65) Prior Publication Data

US 2022/0027953 A1     Jan. 27, 2022

Related U.S. Application Data

(60) Provisional application No. 63/046,682, filed on Jun. 30, 2020.

(51) Int. Cl.
G06Q 30/0251     (2023.01)
G06N 3/04     (2023.01)
G06Q 30/0204     (2023.01)

(52) U.S. Cl.
CPC ........... G06Q 30/0269 (2013.01); G06N 3/04 (2013.01); G06Q 30/0205 (2013.01); G06Q 30/0256 (2013.01)

(58) Field of Classification Search
None
See application file for complete search history.

(56) References Cited

U.S. PATENT DOCUMENTS

| | | | | |
|---|---|---|---|---|
| 2012/0054040 A1* | 3/2012 | Bagherjeiran | ......... | G06Q 30/00 |
| | | | | 705/14.66 |
| 2012/0150626 A1* | 6/2012 | Zhang | .................... | G06N 3/045 |
| | | | | 705/14.42 |

(Continued)

OTHER PUBLICATIONS

J. Song and C. Yuan, "Learning Boltzmann machine with EM-like method," 2016 International Joint Conference on Neural Networks (IJCNN), Vancouver, BC, Canada, 2016, pp. 2282-2289, doi: 10.1109/ IJCNN.2016.7727482. (Year: 2016).*

*Primary Examiner* — Rashida R Shorter
(74) *Attorney, Agent, or Firm* — Schwegman Lundberg & Woessner, P.A.

(57)     ABSTRACT

A system for selecting an expanded audience comprising: a seed audience; an elastic profile store comprising a plurality of consumer profiles each of the consumer profiles comprising a consumer identifier and consumer characteristics wherein the seed audience is matched in the elastic profile store to select a plurality of seed profiles and at least one candidate profile; at least one encoder engine to encode the seed profiles and the candidate profile to output a plurality of encoded seed profiles and an encoded candidate profile; an aggregator engine to receive the encoded seed profiles to determine similar characteristics; a matching engine to match characteristics from the encoded candidate profile with the characteristics from the encoded seed profiles; a threshold engine to determine whether the encoded candidate profile has sufficient similarity to the encoded seed profiles; and in response to a determination by the threshold engine to keep the candidate profile, inclusion of the candidate user id in an expanded audience.

17 Claims, 10 Drawing Sheets

(56)            References Cited

U.S. PATENT DOCUMENTS

2014/0278973  A1*   9/2014  Lowe ................. G06Q 30/0255
                                                                        705/14.53
2020/0184515  A1*   6/2020  deWet ................ G06Q 30/0251
2020/0329258  A1*  10/2020  Wang ...................... G06N 3/045
2022/0156257  A1*   5/2022  Bhatia ...................... G06N 3/08

* cited by examiner

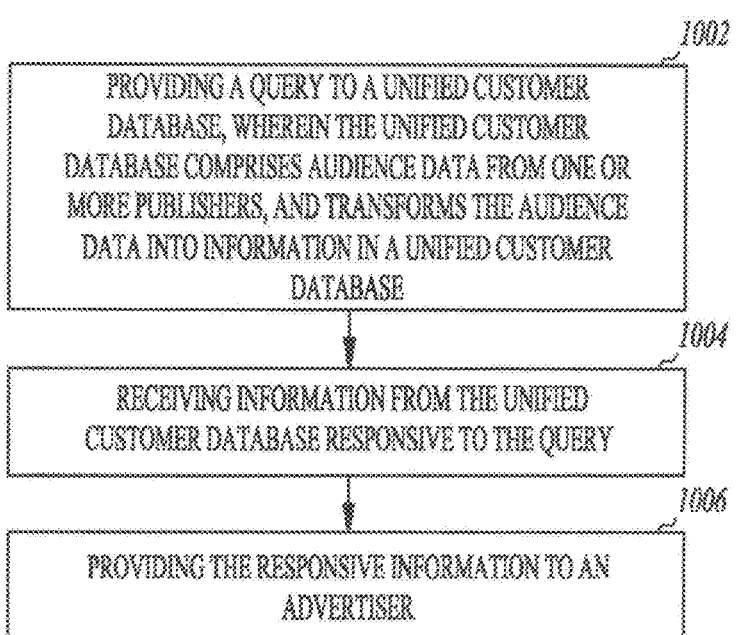

1000

1002

PROVIDING A QUERY TO A UNIFIED CUSTOMER DATABASE, WHEREIN THE UNIFIED CUSTOMER DATABASE COMPRISES AUDIENCE DATA FROM ONE OR MORE PUBLISHERS, AND TRANSFORMS THE AUDIENCE DATA INTO INFORMATION IN A UNIFIED CUSTOMER DATABASE

1004

RECEIVING INFORMATION FROM THE UNIFIED CUSTOMER DATABASE RESPONSIVE TO THE QUERY

1006

PROVIDING THE RESPONSIVE INFORMATION TO AN ADVERTISER

Fig. 10

SYSTEMS AND METHODS OF AUDIENCE EXPANSION USING DEEP AUTOENCODERS

PRIORITY

This application claims the benefit from U.S. Provisional Patent Application 63/046,682, inventors Zachary Jones, et al, entitled "SYSTEMS AND METHODS OF AUDIENCE EXPANSION USING DEEP ENCODERS," which is incorporated by reference in its entirety and made a part thereof.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

Targeted marketing is a commonly used tool for improving return on investment for advertising expenditures. The present disclosure relates to using targeted marketing in order to expand a known audience and serve as effective customer acquisition. Namely, a machine or system incorporating a machine learning algorithm—deep autoencoding—that can be used to construct a useful mathematical representation of an advertiser's customers used for audience expansion process which takes a selected set of customers and finds other customers who are similar Online marketing platforms allow advertisers to deliver messaging to an audience. Being able to present advertisements to select users who are more receptive to the advertising is likely to yield a better return. Presenting advertisements to existing customers is further likely to produce diminishing returns. Therefore, it is beneficial to present advertisements to an expanded audience that is most like known ideal customers. In the past, generating expanded audiences has been increasingly difficult with expanded data created through the growth of the Internet. The more data there is on each individual, the more difficult it is to approximate a similar user profile. Conventional techniques for processing data produced required too much computational cost and substantial memory storage. Processing such computations could be taxing on systems and take weeks to produce a result A valuable extension to audience targeting systems is therefore an audience expansion which allows an advertiser to upload a "seed audience" and expand the seed audience with additional customers who are similar. The present invention uses deep autoencoders to train and generate mathematical representations of seed customers. These representations allow for a straightforward comparison between existing customers and potential viewers of an advertisement who may become future customers and thus a real-time selection of an expanded ideal audience.

DESCRIPTION OF THE DRAWINGS

Some embodiments of the present disclosure are illustrated by way of example and not limitation in the figures of the accompanying drawings, in which like reference numbers indicate similar elements.

FIG. 10 is a flow chart depicting some operations in a method of managing an advertising exchange including the consumer data in accordance with an example embodiment.

DETAILED DESCRIPTION OF THE INVENTION

Figure 1:
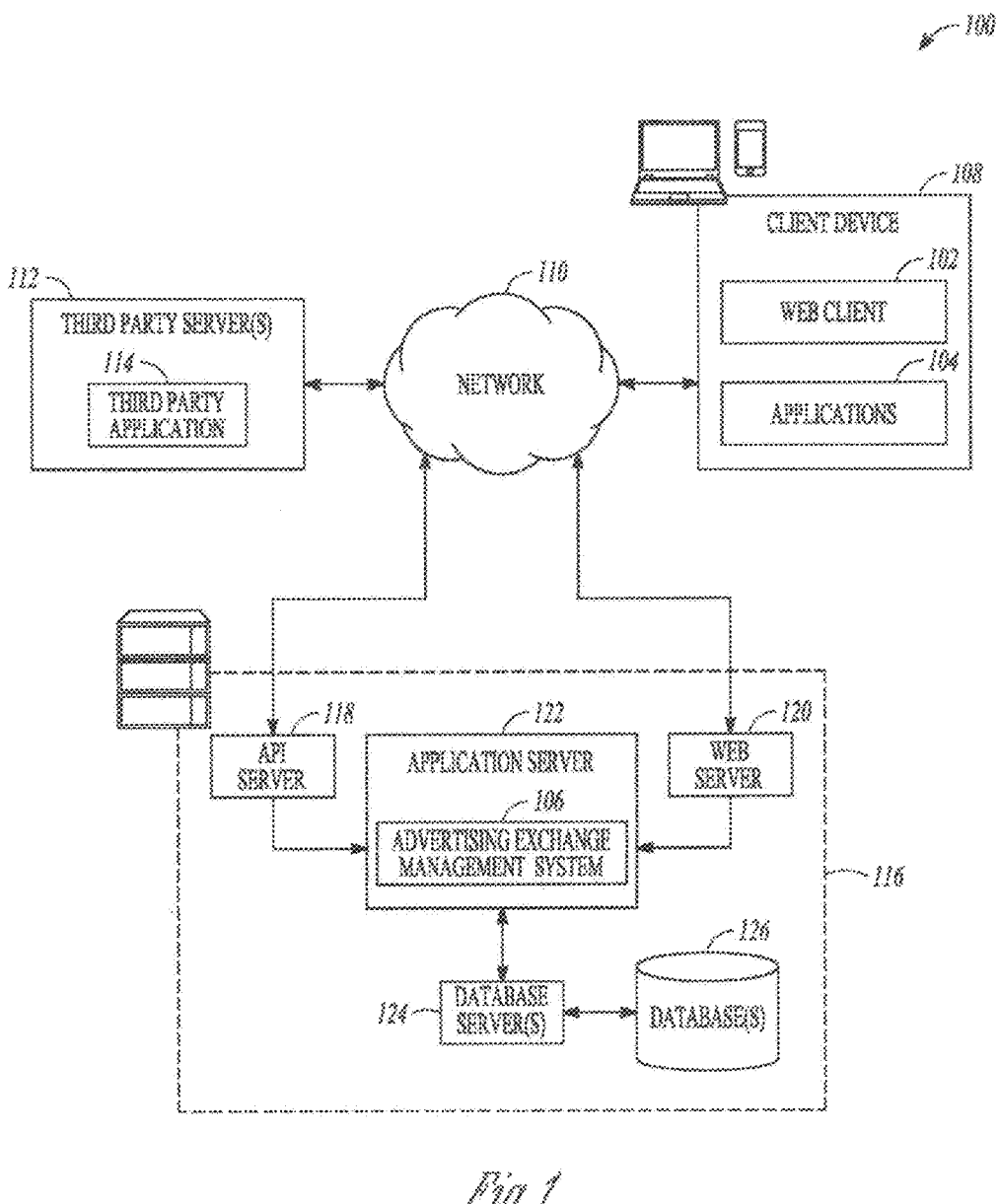
FIG. 1 is a block diagram illustrating a networked system according to an example embodiment

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail. It should also be understood by those with skill in the art may combine elements from various embodiments in practicing the present invention.

Systems and methods in accordance with the disclosure herein use machine learning to identify expanded audiences based on seeded ideal audiences for a publisher or advertiser in near real time.

In this manner, the system is comprised of training routines for a deep autoencoder model, a procedure and system which uses the trained autoencoder to transform a large dataset of text-based customer representations into a more useful representation, and an algorithm for audience expansion using the representations generated by the model.

In general, "INVENTORY" in this context may be a term for a unit of advertising space, such as a magazine page, television airtime, direct mail message, email messages, text messages, telephone calls, etc. Advertising inventory may be advertisements a publisher has available to sell to an advertiser. In certain embodiments, advertising inventory may refer to a number of email advertisements being bought and/or sold. The terms INVENTORY and ADVERTISING INVENTORY may be used interchangeably. For email marketing campaigns, advertising inventory is typically an email message.

A "PUBLISHER" in this context may be an entity that sells advertising inventory, such as those produced by the systems and methods herein, to their email subscriber database. An advertiser may be a buyer of publisher email inventory. Examples of advertisers may include various retailers. A marketplace may allow advertisers and publishers to buy and sell advertising inventory. Marketplaces, also called exchanges or networks, may be used to sell display, video, and mobile inventory. In certain embodiments, a marketplace may be an email exchange/email marketplace. An email exchange may be a type of marketplace that facilitates buying and/or selling of inventory between advertisers and publishers. This inventory may be characterized based on customer attributes used in marketing campaigns. Therefore, an email exchange may have inventory that can be queried by each advertiser. This may increase efficiency of advertisers when purchasing inventory. A private network may be a marketplace that has more control and requirements for participation by both advertisers and publishers.

An "INDIVIDUAL RECORD" or "PROSPECT" in this context may be at least one identifier of a target. In certain embodiments, the individual record/prospect may be identified by a record identification mechanism, such as a specific email address (individual or household) that receives an email message.

An "AUDIENCE" in this context may be a group of records, which may be purchased as inventory. In certain embodiments, an audience may be a group of records selected from publisher databases of available records such as a group of consumers and their affiliated profiles. The subset of selected records may adhere to a predetermined set of criteria, such as common age range, common shopping habits, and/or similar lifestyle situation (i.e., stay-at-home mother). Advertisers generally select the predetermined set of criteria when they are making an inventory purchase.

"CARRIER SIGNAL" in this context in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT" in this context refers to a device, a physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, n the example form of an application 104, are hosted and execute on the client device 108. The networked system 116 includes an application server 122, which in turn hosts an advertising exchange management system 106 for management of an advertising exchange using email data according to one embodiment. The advertising exchange management system 106 provides a number of functions and services to the application 104 that accesses the networked system 116. The application 104 also provides a number of interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the advertising exchange management system 106, which includes components or applications. The application server 122 is, in turn, shown to be coupled to a database server 124 that facilitates access to information storage repositories (e.g., a database 126). In an example embodiment, the database 126 includes storage devices that store information accessed and generated by the advertising exchange management system 106.

Additionally, a third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., advertising exchange management system 106) via the web interface supported by the web server 120. Similarly, the application 104 (e.g., an "app") accesses the various services and functions provided by the advertising exchange management system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The advertising exchange management system 106 could also be implemented as a standalone software program, which does not necessarily have networking capabilities.

Figure 2:
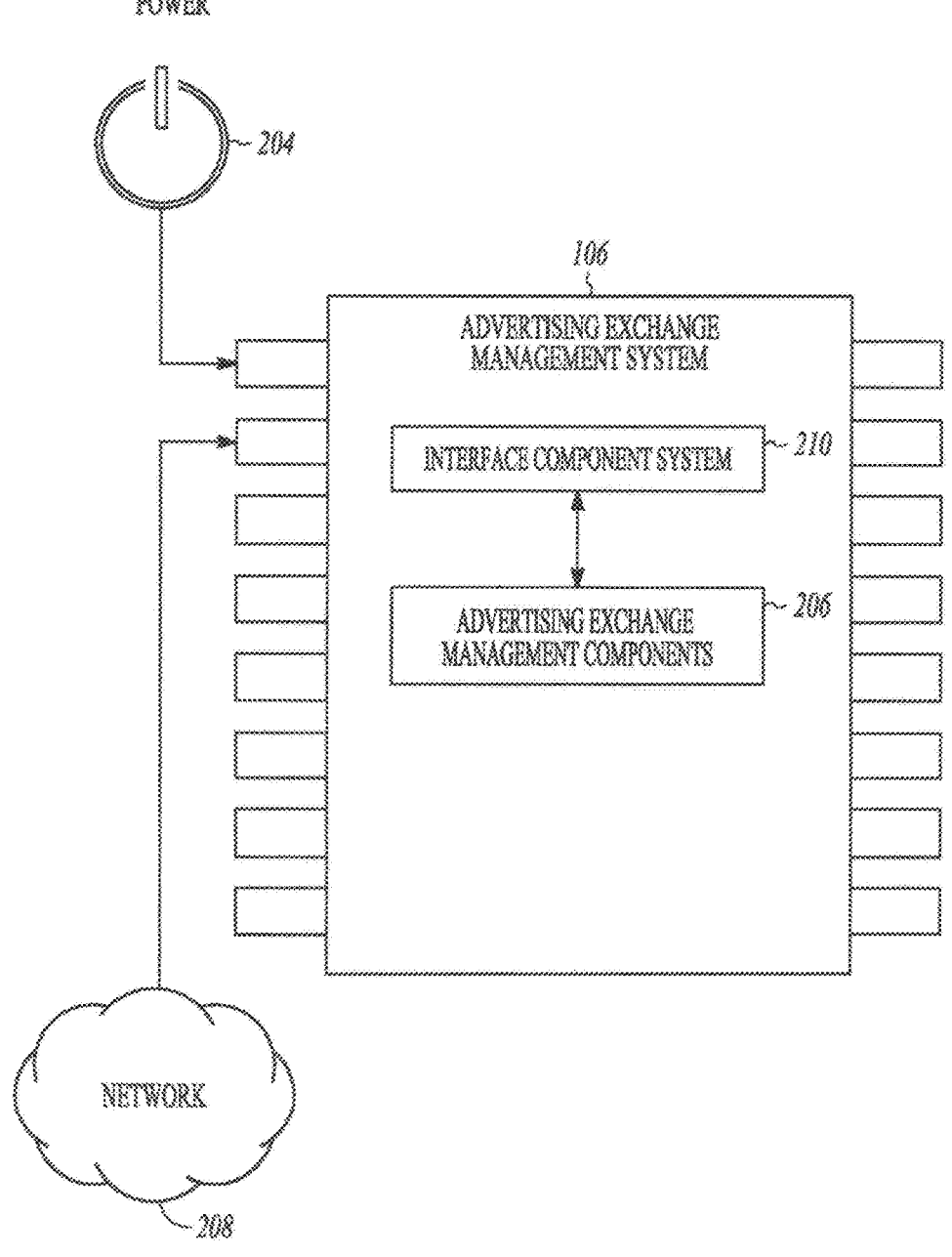
FIG. 2 is a block diagram showing architectural details of the networked system, according to some example embodiments.

FIG. 2 is a block diagram showing architectural details of an advertising exchange management system 106, according to some example embodiments. Specifically, the advertising exchange management system 106 is shown to include an interface component 210 by which the advertising exchange management system 106 communicates (e.g., over a network 208) with other systems within the SaaS network architecture 100.

The interface component 210 is collectively coupled to one or more advertising exchange management components 206 that operate to provide specific aspects of management of an advertising exchange using email data, in accordance with the methods described further below with reference to the accompanying drawings.

Figure 3:
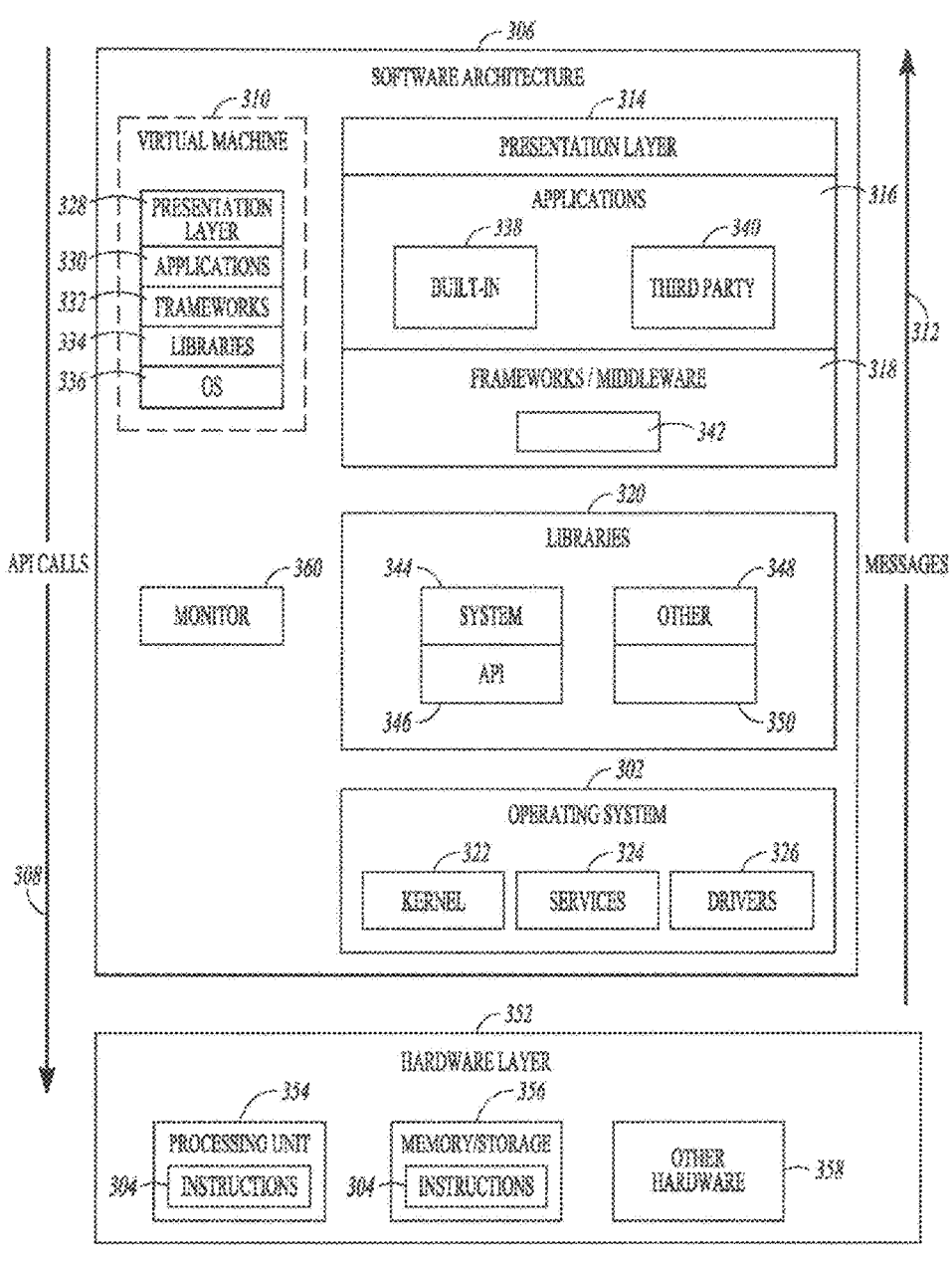
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) API calls 308 through the software stack and receive messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H264, MP3, AAC, AMR, IPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface ((QUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform, and may be mobile software running on a mobile operating system such as IOS™, AN DROID™, WIN DOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
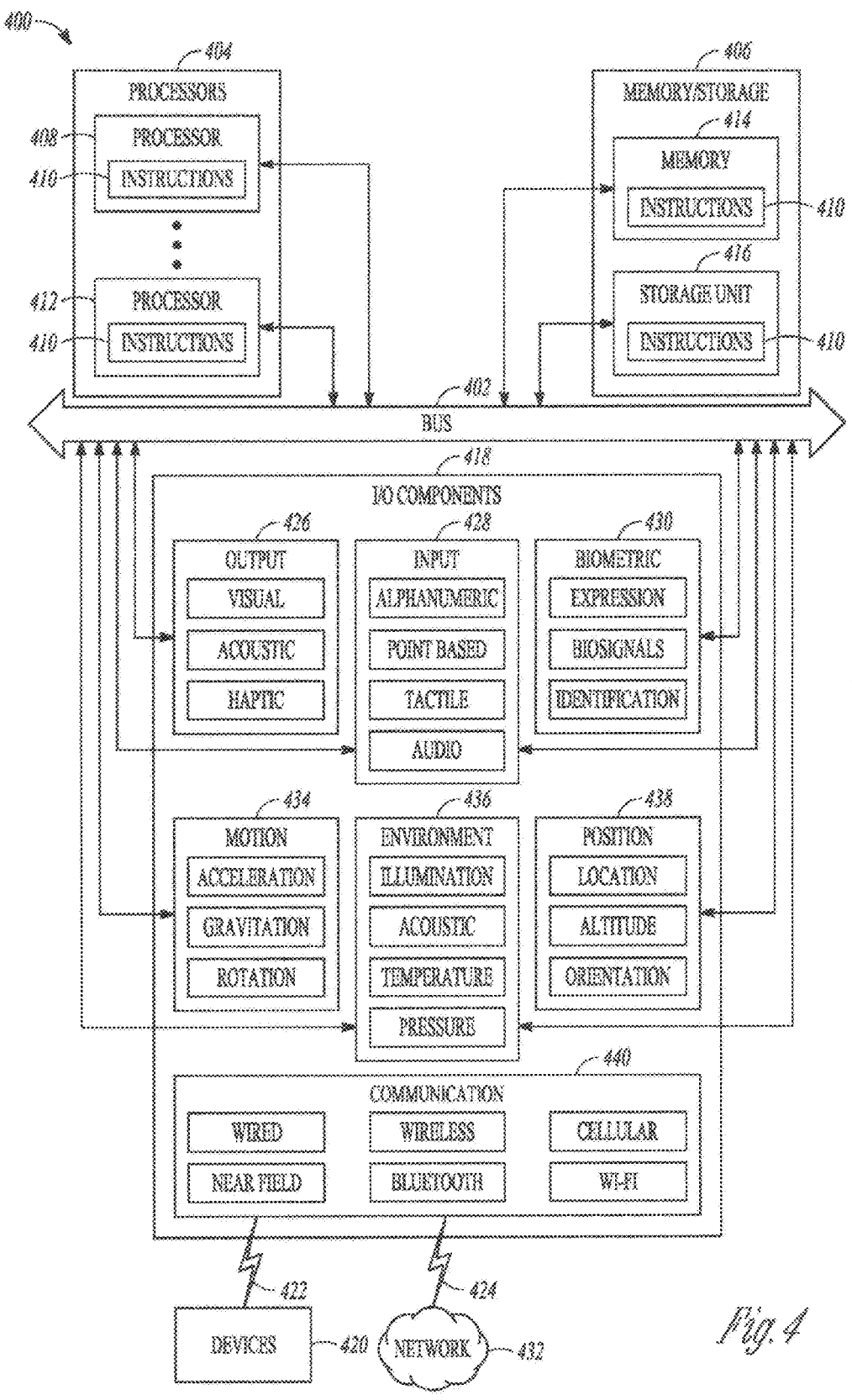
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the specific described and illustrated functions in the manner described.

In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifier; or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

In this example, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java, .NET Framework (VB.NET, ASP.NET, AJAX.NET, etc.); and other e-commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Figure 5:
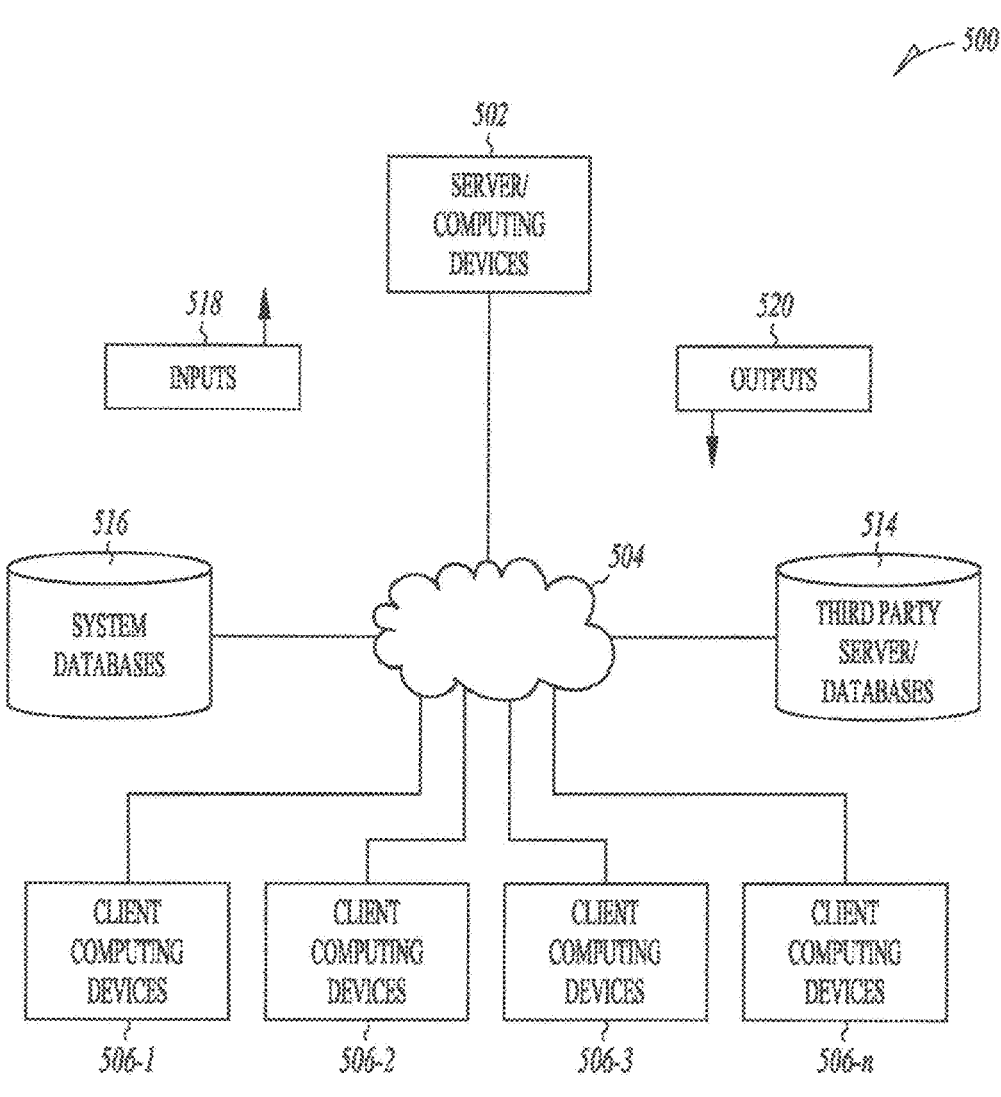
FIG. 5 is a block diagram illustrating another exemplary system for managing consumer data

FIG. 5 shows a block diagram of another exemplary system 500 for management of an advertising exchange using email data according to one embodiment. In this exemplary implementation, system 500 may include one or more servers/computing devices 502 (e.g., server 1, server 2, . . . , server n) operatively coupled over network 504 to one or more client computing devices 506-1 to 506-_n_, which may include one or more consumer computing devices, one or more provider computing devices, one or more remote access devices, etc. The one or more servers/computing devices 502 may also be operatively connected, such as over a network 504, to one or more third-party servers/databases 514 (e.g., database 1, database 2, . . . , database n). The one or more servers/computing devices 502 may also be operatively connected, such as over a network 504, to one or more system databases 516 (e.g., database 1, database 2, . . . , database n). Various devices may be connected to the system 500, including, but not limited to, client computing devices, consumer computing devices, provider computing devices, remote access devices, etc. The system 500 may receive inputs 518 and outputs 520 from the various computing devices, servers and databases.

Server/computing device 502 may represent, for example, any one or more of a server, a general-purpose computing device such as a server, a personal computer (PC), a laptop, a smart phone, a tablet, and/or so on. Networks 504 represent, for example, any combination of the Internet, local area network(s) such as an intranet, wide area network(s), cellular networks, WiFi networks, and/or so on. Such networking environments are commonplace in offices, enterprise-wide computer networks, etc. Client computing devices 506, which may include at least one processor, represent a set of arbitrary computing devices executing application(s) that respectively send data inputs to server/computing device 502 and/or receive data outputs from server/computing device 502. Such computing devices include, for example, one or more of desktop computers, laptops, mobile computing devices (e.g., tablets, smart phones, human-wearable device), server computers, and/or so on. In this implementation, the input data comprises, for example, real-time campaign data, audience profile, attribution data, and/or so on, for processing with server/computing device 502. In one implementation, the data outputs include, for example, emails, templates, forms, and/or so on. Embodiments of the present disclosure may also be used for collaborative projects with multiple users logging in and performing various operations on a data project from various locations. Embodiments of the present disclosure may be web-based, smart phone-based and/or tablet-based or human-wearable device based.

In this exemplary implementation, server/computing device 502 includes at least one processor coupled to a system memory. System memory may include computer program modules and program data.

Figure 6:
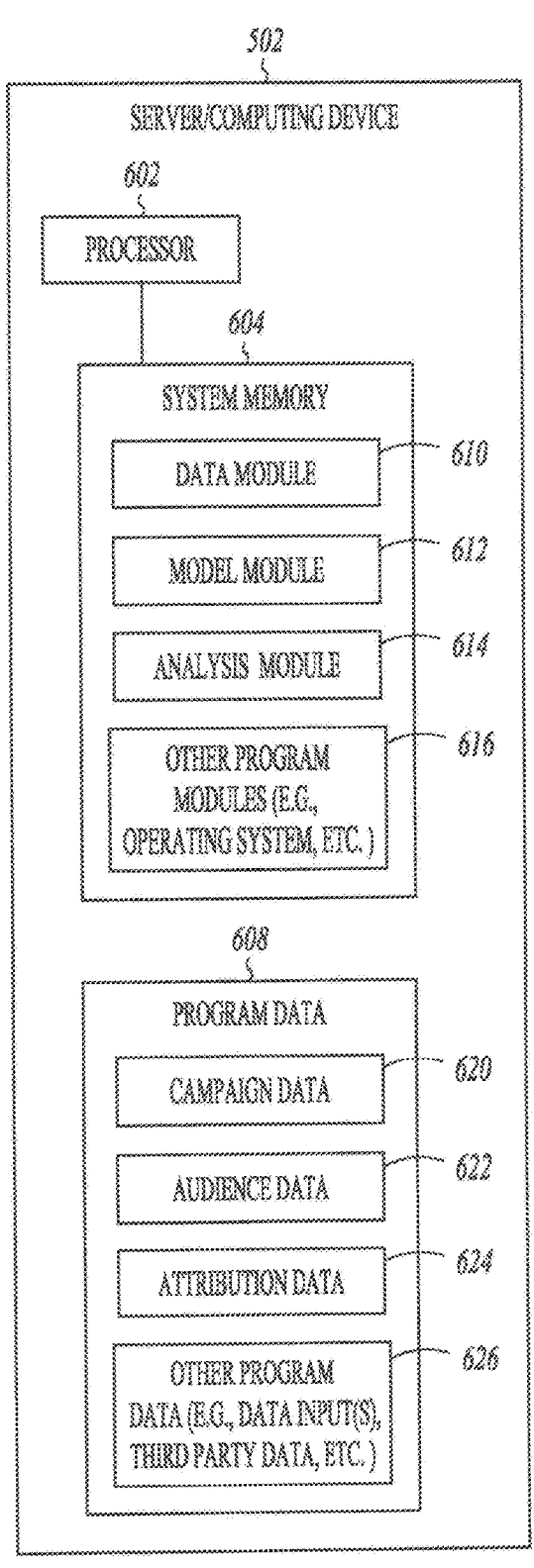
FIG. 6 is a block diagram illustrating an example for computational aspects for managing consumer data.

In this exemplary implementation, server/computing device 502 includes at least one processor 602 coupled to a system memory 604, as shown by the block diagram in FIG. 6. System memory 604 may include computer program modules 606 and program data 608. In this implementation program modules 606 may include data module 610, model module 612, analysis module 614, and other program modules 616 such as an operating system, device drivers, etc. Each module 610 through 616 may include a respective set of computer-program instructions executable by processor (s) 602. This is one example of a set of program modules, and other numbers and arrangements of program modules are contemplated as a function of the particular arbitrary design and/or architecture of server/computing device 502 and/or system 500 (FIG. 5). Additionally, although shown on a single server/computing device 502, the operations associated with respective computer-program instructions in the program modules 606 could be distributed across multiple computing devices. Program data 608 may include campaign data 620, audience data 622, attribution data 624, and other program data 626 such as data input(s), third-party data, and/or others.

Finding common—and the relevant common—attributes requires processing data about ideal consumers in order to determine how to best expand the target audience. In such a way, a customer data server stores a variety of data about users and user behavior. The data can relate to web sites visited by the user or the user's device, purchases made, telephone calls made by a mobile device, physical locations visited, browsing behavior and the like. When tracked over time, these collective attributes can provide a meaningful understanding of each consumer's interests.

Figure 7:
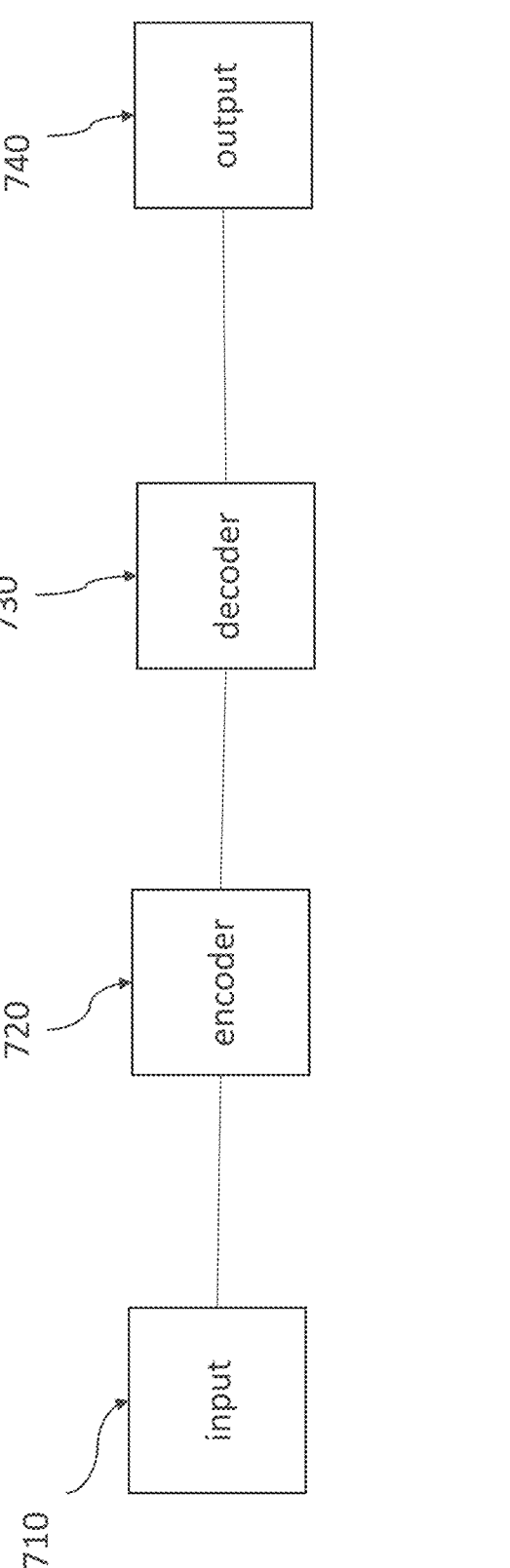
FIG. 7 is a block diagram of a system for a system used according to example embodiments.

As shown in FIG. 7, the system takes an input 710, encodes the input into a compressed version via an encode process 720, then decodes the compressed version via a decoder process 730 to create an output 740. The output 740 is intended to be a sparse reconstruction of the input data 710. The output layer and input layer ideally have the same number of nodes.

The input data 710 passed into the encoder 720 to reduce the dimensionality of the input data 710. Reducing dimensionality may help reduce the memory required while suffering minor losses in fidelity and allow for lower bandwidth usage. Once trained, the reduction allowed for targeted values and faster processing of comparison in order to achieve consumer audience expansion. Although FIG. 7 depicts a single encode level, in ideal embodiments, there are multiple encoders—each encode level, the encoded data becomes increasingly summarized/abstracted. Decode layer (s) reconstructs the original data symmetric with the encode layer(s).

Figure 8:
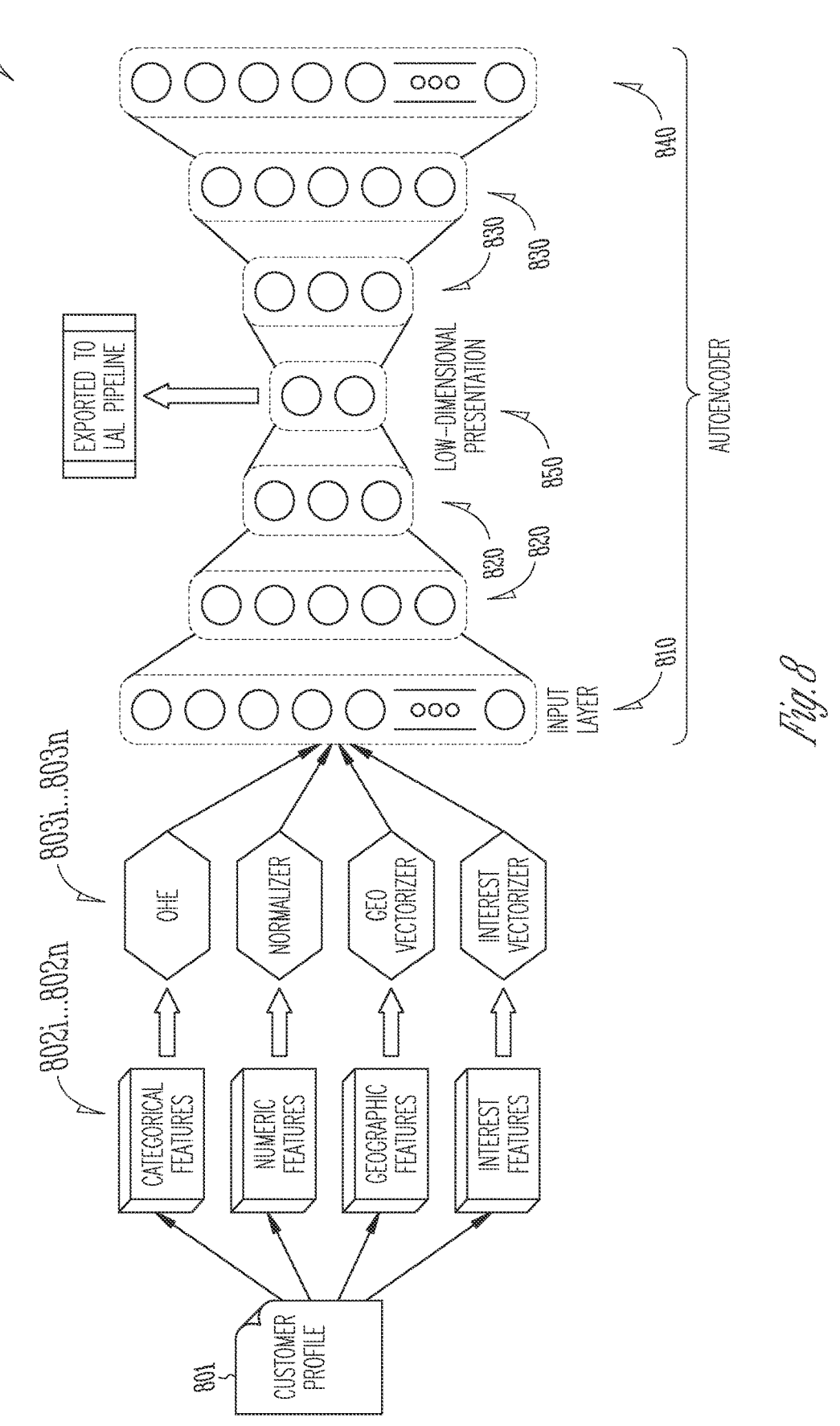
FIG. 8 is a block diagram of a system for encoding consumer profiles according to some example embodiments.

For example, FIG. 8 depicts a representation of an auto-encoder structure having 5 layers. Every layer in the network is connected with adjacent layers. It should be appreciated that in practice, there may be more or fewer layers.

The autoencoder can be further comprise combining instances of neural networks Restricted Boltzmann Machine (RBM). Training of the autoencoder may be performed through backpropagation of the error, or any other method used to train feedforward neural network. In ideal embodiments, the system uses neural networks to solve classification problems and hidden layers to build questions. The RBM produces a set of weights between the neural units such that hidden layers reconstruct training vectors with high probability in the visible layer.

One method for training the RBM is contrast divergence. Each iteration of contrast divergence is divided into positive and negative phases. In the positive phase, the visible layer's state is set to the same state as that of a training vector (important consumer characteristics forming a profile). Then, according to the weight matrix describing the connection strengths between neural units, the hidden layer's state is stochastically determined. The algorithm records the resulting states of the hidden units in this positive phase. Next, in the negative phase, the hidden layer's states and the weight matrix stochastically determine the states of the visible layer. From there, the network uses the visible layer to determine the final state of the hidden units.

Once the first RBM is trained using the CD method, all the training vectors are shown to the RBM once more and record the resulting hidden unit states are recorded corresponding to each vector. Then the next RBM in the "state" can be moved to within the autoencoder and to the hidden states are used as input vectors into the new RBM, beginning the process anew. From there the new RBM is trained, new hidden states are gathered, and the next RBM in line is trained. Once all RBMs in the autoencoder have been trained, the process of standard gradient descent using backpropagation begins. Normally, gradient descent requires labels to successfully backpropagate error, which implies supervised training. However, due to the function and structure of the autoencoder, the data labels happen to be the data itself.

In ideal embodiments, the system uses these neural networks to generate approximations of customer profiles in order to compare against other consumer profiles. The input is typically a combination of image as collective customer properties. The customer properties are stored in an identify graph. FIG. 8 shows a representation of an ideal embodiment of the one customer profile being run through the neural networks as disclosed.

The system encodes and decodes the customer identity graph to create a sparse approximation of the customer profile. The customer profile contains collected information about a customer or consumer. Such information may include demographic information, purchase history, browsing history, geographic location data, employment data, or any other data that is known about a consumer.

In this way, a customer profile contains a number of customer property vectors. FIG. 8 is a diagram of a consumer profile autoencoder 800. In FIG. 8, the customer profile is shown to have categorical features, numeric features, geographic features, and interest features, but it should be appreciated that the customer profile may have any number or type of categories that pertain to the customer.

Each of the vectors is run through an individualized program to prepare for the customer input layer. The categorical features are fun through an OHE, the numeric features are run through a normalizer, the geographic features are run through a geo vectorizer, and the interest features are run through an interest vectorizer. The output of each of these forms the input layer.

In some ideal embodiments, customer profiles 801 can be broken down into characteristic components 802*i*, 802*ii*, 802*iii*, . . . , 802*n* and then each run through a corresponding vectorizer $803i$, $803ii$, . . . $803n$. By way of example, Interest Features $802n$ may be run through an Interest Vectorizer $803n$ while a numeric feature $802ii$ may be run through a normalizer $803ii$. It should be understood that there may be any number of components/characteristics and any number of types of vectorizers and that the numbering in FIG. 8 is intended to be illustrative and not limiting.

The collective results of the various vectorizers' 803 ideally becomes the input 810 for the autoencoder system with equal number of encode layers 820 to decode layers 830 with the lowest dimensional representation 850 in the middle of the encode and decode layers. The output from the autoencoder 800 constitutes an approximation of the consumer profile. It should be appreciated that while three encode layers and three decode layers are pictured, any number of encode and decode layers may be used. Ideally, there are the same number of encode and decode layers.

The system encodes the input layer and has a plurality of hidden layers. At the most encoded layer, the system creates a low-dimensional representation which is exported to the LAL pipeline. The low-dimensional representation of the customer profile vector is then run through equal decoder layers to reach the output layer equal in nodes to the input layer.

Figure 9:
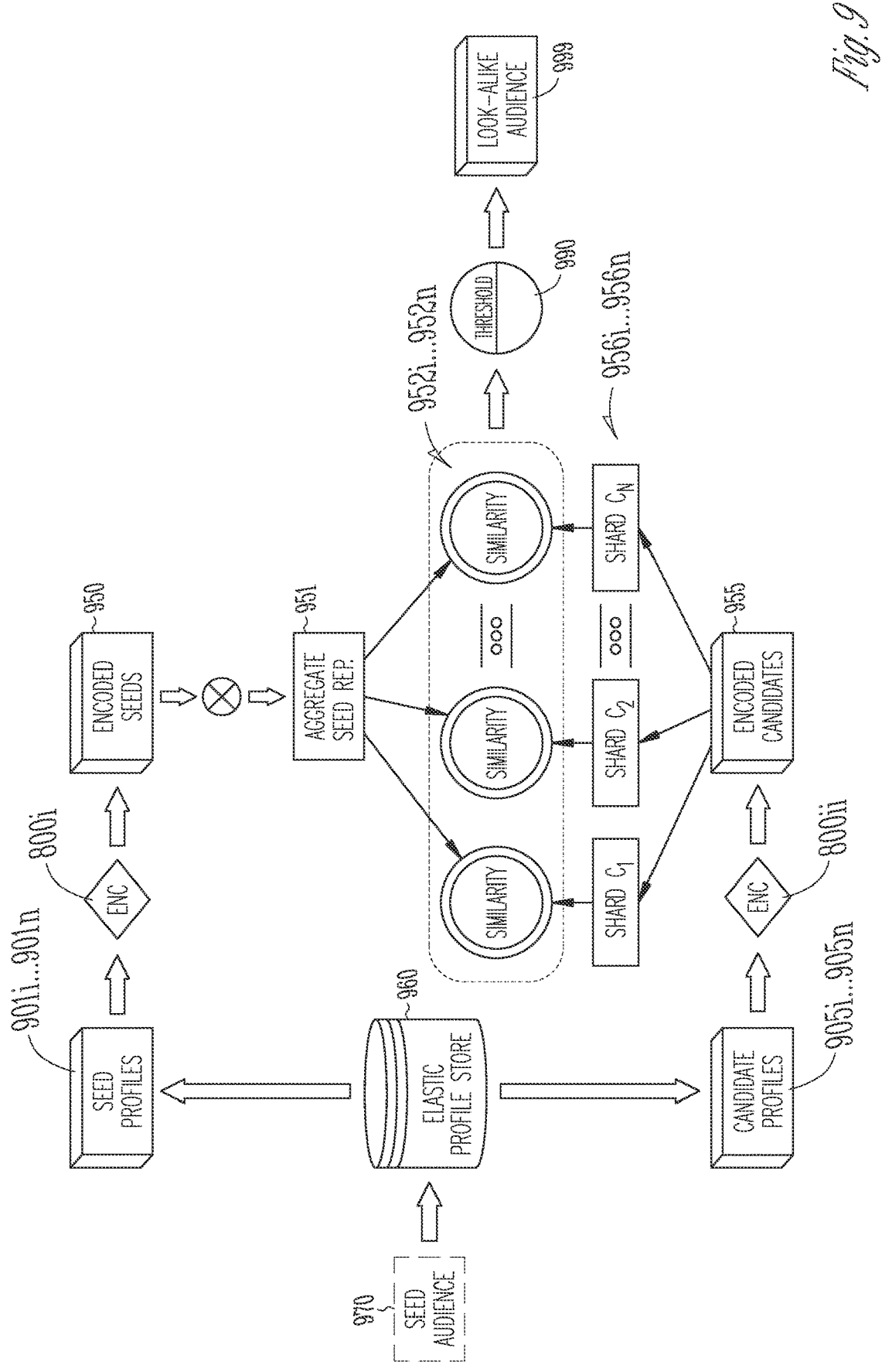
FIG. 9 is a block diagram of a system for deep learning to select expanded audience according to some example embodiments.

In ideal embodiments, a retailer has a list of ideal customers—the list forming the seed audience. The seed list is passed through the elastic profile store containing customer profiles—including both customer profiles for the seed audience and for candidate audiences. Seed profiles are encoded to create a group of encoded seeds which are then aggregated to create aggregate seeded representative as is illustrated in FIG. 9. Similarly, candidate profiles are encoded to create encoded candidates. The encoded candidates are compared with the aggregate seed representative on a number of characteristics C1, C2, C3, . . . Cn. The system determines a threshold similarity on the parsed characteristics. Once an encoded candidate is similar past the threshold, the system proposes the candidate as an expanded audience consumer. In this way, the system suggests candidates similar to those known to be ideal audience.

In some embodiments, the system confirms which of the expanded audience consumers are ideal and learns which consumer characteristics are most important to effectively target additional consumers.

FIG. 9 illustrates a system using consumer profile encoding along with matching seed audience consumer profile characteristics in order to determine additional consumers to add to a targeted audience group.

In ideal embodiments, a seed audience is supplied with a number of consumer identifiers 970. The seed audience is matched against consumer profiles in the elastic profile store 960. It should be appreciated that the elastic profile storage 960 may be a data cloud, a data cloud cluster, or any other like mechanism.

The elastic profile storage 960 further selects candidate profiles $905i$, $905ii$, . . . , $905n$. The seed profiles and candidate profiles all have consumer characteristics in addition to the identifier. These characteristics can ideally include demographics, browsing behaviors, geographic locations, transactional purchase history, credit history, interests, psychographic information, and any other information about the consumer.

The seed profiles and the candidate profiles are each run through encoders 800 to have output encoded seeds and encoded candidate profiles to create approximation of the seed profiles 950 and the candidate profiles 955. The encoded seed profiles are run through an aggregator in order to determine similarities between the seed audience 952. A matching layer identifies shared characteristics 956 with the similarities characteristics 952. The level of matching is run through a threshold engine 990.

The threshold engine 990 determines whether the candidate profile shares sufficient characteristics with the seed audience. It should be appreciated that the threshold engine 990 may have pre-defined rules, adjust and learn over time, or be manually adjusted based on the desired audience expansion.

In some embodiments, the threshold engine 990 automatically adjusts depending on the number of candidate profiles that meet the threshold. In these embodiments, it should be understood that there is a preset audience expansion rate or number such that the threshold loosens if there are too few candidates meeting the threshold until the ideal audience expansion is reached. Alternatively, the threshold may determine that too many candidates are being selected and restrict the qualifications for candidate inclusion.

After the threshold engine, the audience expander indicates consumer profiles that have passed through and should be included in the expanded audience 999.

It should be appreciated that the system may further extract the ideal characteristics in the seed audience and in the tuned threshold engine in order to tune bidding strategies for available inventory with a publisher or through an inventory bidding platform.

An example flow chart of another method of management of an advertising exchange using the consumer profiles is shown in FIG. 10. The method 1000 may include, at operation 1002, providing a query to a unified customer database, wherein the unified customer database comprises audience data from one or more publishers, and transforms the audience data into information in a unified customer database; at operation 1004, receiving information from the unified customer database responsive to the query; and, at operation 1006, providing the responsive information to an advertiser.

In some examples, a non-transitory machine-readable medium includes instructions that, when read by a machine, cause the machine to perform operations comprising at least the non-limiting example operations summarized above with reference to the included Figures, and described more generally herein with reference to the accompanying figures.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As used herein, a database may be a relational database, flat file database, relational database management system, object database management system, operational database, data warehouse, hyper media database, post-relational database, hybrid database models, RDF database, key value database, XML database, XML store, text file, flat file or other type of database.

Although not required, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operation Systems; databases such as SQL Server, Oracle, NOSQL, and DB2; Business analytic/Intelligence tools such as SPSS, Cognos, SAS, etc.; development tools such as Java, NET framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

It should further be appreciated that embodiments described herein may be practices independently or may be practiced in combination with parts of some embodiments combining with parts of other embodiments or entire embodiments together, and the like.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system for selecting an expanded audience comprising:

one or more hardware processors;

at least one machine-storage medium for storing instructions that, when executed by the one or more hardware processors, cause the one or more hardware processors to perform operations comprising:

matching a seed audience in an elastic profile store to select a plurality of seed profiles and a plurality of candidate profiles, the elastic profile store comprising a consumer identifier and consumer characteristics;

training an autoencoder that comprises a neural network, the neural network comprising multiple neural units and multiple Restricted Boltzmann Machine (RBM) instances, each RBM instance generating weights between one or more of the multiple neural units, the training comprises:

performing contrast divergence iteration on a first RBM instance by determining hidden unit states in a positive phase and visible unit states in a negative phase for a set of training vectors, the visible unit states being determined based on the hidden unit states and a weight matrix of the first RBM instance, determining a final state of hidden units based on the visible unit states, using the final state of hidden units as inputs to train a next RBM instance, and upon completion of training the multiple RBM instances, fine-tuning the autoencoder by performing gradient descent using backpropagation;

encoding, using the trained autoencoder, the plurality of seed profiles to generate a plurality of encoded seed vectors, each encoded seed vector representing a characteristic of a seed profile in a vector space, the encoding of the plurality of seed profiles reducing dimensionality of the plurality of seed profiles;

aggregating the plurality of encoded seed vectors that are encoded by the trained autoencoder to generate one or more aggregated seed representative vectors in the vector space that store a representation of a number of characteristics of the plurality of seed profiles;

encoding, using the trained autoencoder, a plurality of candidate profiles to generate a plurality of encoded candidate vectors, each encoded candidate vector representing a characteristic of a candidate profile in the plurality of candidate profiles;

matching, using a threshold engine, the plurality of encoded candidate vectors with the one or more aggregated seed representative vectors to determine one or more matched encoded candidate vectors, each matched encoded candidate vector having a degree of similarity with an aggregated seed representative vector above a threshold, the threshold for the matching being determined based on a present audience expansion rate, each matched encoded candidate vector corresponds to a low-dimensional representation at a last encoded layer of the trained autoencoder;

in response to determining the one or more matched encoded candidate vectors, identifying one or more candidate profiles associated with the one or more matched encoded candidate vectors as one or more expanded audience profiles;

aggregating the seed profiles and the one or more expanded audience profiles as the expanded audience;

determining an effective consumer characteristic that is above a similarity threshold, among the consumer characteristics, for a targeted communication to the expanded audience; and transmitting data, including the targeted communication, to the expanded audience.

2. The system of claim 1, wherein the characteristic of the seed profile corresponds to one of: demographic information, purchase history information, browsing history information, geographic location information, and employment information.

3. The system of claim 1, wherein the autoencoder comprises a plurality of instances of neural networks Restricted Boltzmann Machine (RBM).

4. The system of claim 3, wherein the RBM is trained using a contrast divergence algorithm.

5. The system of claim 1, wherein the threshold engine is associated with a plurality of pre-defined threshold rules, and wherein the operations comprise:

adjusting the plurality of pre-defined threshold rules based on a number of matched encoded candidate vectors in accordance with a target size of audience expansion.

6. The system of claim 5, wherein the threshold engine uses one or more machine learning models to adjust a plurality of pre-defined threshold rules.

7. The system of claim 1, wherein the operations comprise:

tuning the threshold engine to determine one or more characteristics of the plurality of seed profiles for expanded audience profile selection.

8. The system of claim 7, wherein the one or more characteristics are used in a bidding strategy for available inventory.

9. A computer-readable medium for storing instructions that, when executed by one or more hardware processors, cause the one or more hardware processors to perform operations comprising:

matching a seed audience in an elastic profile store to select a plurality of seed profiles and a plurality of candidate profiles, the elastic profile store comprising a consumer identifier and consumer characteristics;

training an autoencoder that comprises a neural network, the neural network comprising multiple neural units and multiple Restricted Boltzmann Machine (RBM) instances, each RBM instance generating weights between one or more of the multiple neural units, the training comprises:

performing contrast divergence iteration on a first RBM instance by determining hidden unit states in a positive phase and visible unit states in a negative phase for a set of training vectors, the visible unit states being determined based on the hidden unit states and a weight matrix of the first RBM instance, determining a final state of hidden units based on the visible unit states, using the final state of hidden units as inputs to train a next RBM instance, and upon completion of training the multiple RBM instances, fine-tuning the autoencoder by performing gradient descent using backpropagation;

encoding, using the trained autoencoder, the plurality of seed profiles to generate a plurality of encoded seed vectors, each encoded seed vector representing a characteristic of a seed profile in a vector space, the encoding of the plurality of seed profiles reducing dimensionality of the plurality of seed profiles;

aggregating the plurality of encoded seed vectors that are encoded by the trained autoencoder to generate one or more aggregated seed representative vectors in the vector space that store a representation of a number of characteristics of the plurality of seed profiles;

encoding, using the trained autoencoder, a plurality of candidate profiles to generate a plurality of encoded candidate vectors, each encoded candidate vector representing a characteristic of a candidate profile in the plurality of candidate profiles;

matching, using a threshold engine, the plurality of encoded candidate vectors with the one or more aggregated seed representative vectors to determine one or more matched encoded candidate vectors, each matched encoded candidate vector having a degree of similarity with an aggregated seed representative vector above a threshold, the threshold for the matching being determined based on a present audience expansion rate, each matched encoded candidate vector corresponds to a low-dimensional representation at a last encoded layer of the trained autoencoder;

in response to determining the one or more matched encoded candidate vectors, identifying one or more candidate profiles associated with the one or more matched encoded candidate vectors as one or more expanded audience profiles;

aggregating the seed profiles and the one or more expanded audience profiles as the expanded audience;

determining an effective consumer characteristic that is above a similarity threshold, among the consumer characteristics, for a targeted communication to the expanded audience; and transmitting data, including the targeted communication, to the expanded audience.

10. A method comprising:

matching a seed audience in an elastic profile store to select a plurality of seed profiles and a plurality of candidate profiles, the elastic profile store comprising a consumer identifier and consumer characteristics;

training an autoencoder that comprises a neural network, the neural network comprising multiple neural units and multiple Restricted Boltzmann Machine (RBM) instances, each RBM instance generating weights between one or more of the multiple neural units, the training comprises:

performing contrast divergence iteration on a first RBM instance by determining hidden unit states in a positive phase and visible unit states in a negative phase for a set of training vectors, the visible unit states being determined based on the hidden unit states and a weight matrix of the first RBM instance, determining a final state of hidden units based on the visible unit states, using the final state of hidden units as inputs to train a next RBM instance, and upon completion of training the multiple RBM instances, fine-tuning the autoencoder by performing gradient descent using backpropagation;

encoding, using the trained autoencoder, the plurality of seed profiles to generate a plurality of encoded seed vectors, each encoded seed vector representing a characteristic of a seed profile in a vector space, the encoding of the plurality of seed profiles reducing dimensionality of the plurality of seed profiles;

aggregating the plurality of encoded seed vectors that are encoded by the trained autoencoder to generate one or more aggregated seed representative vectors in the vector space that store a representation of a number of characteristics of the plurality of seed profiles;

encoding, using the trained autoencoder, a plurality of candidate profiles to generate a plurality of encoded candidate vectors, each encoded candidate vector representing a characteristic of a candidate profile in the plurality of candidate profiles;

matching, using a threshold engine, the plurality of encoded candidate vectors with the one or more aggregated seed representative vectors to determine one or more matched encoded candidate vectors, each matched encoded candidate vector having a degree of similarity with an aggregated seed representative vector above a threshold, the threshold for the matching being determined based on a present audience expansion rate, each matched encoded candidate vector corresponds to a low-dimensional representation at a last encoded layer of the trained autoencoder;

in response to determining the one or more matched encoded candidate vectors, identifying one or more candidate profiles associated with the one or more matched encoded candidate vectors as one or more expanded audience profiles;

aggregating the seed profiles and the one or more expanded audience profiles as the expanded audience;

determining an effective consumer characteristic that is above a similarity threshold, among the consumer characteristics, for a targeted communication to the expanded audience; and transmitting data, including the targeted communication, to the expanded audience.

11. The method of claim 10, wherein the threshold engine uses one or more machine learning models to adjust a plurality of pre-defined threshold rules associated with the threshold engine.

12. The method of claim 10, wherein the characteristic of the seed profile corresponds to one of:

demographic information, purchase history information, browsing history information, geographic location information, and employment information.

13. The method of claim 10, wherein the autoencoder comprises a plurality of instances of neural networks Restricted Boltzmann Machine (RBM).

14. The method of claim 13, wherein the RBM is trained using a contrast divergence algorithm.

15. The method of claim 10, wherein the threshold engine is associated with a plurality of pre-defined threshold rules, comprising:

adjusting the plurality of pre-defined threshold rules based on a number of matched encoded candidate vectors in accordance with a target size of audience expansion.

16. The method of claim 10, comprising:

tuning the threshold engine to determine one or more characteristics of the plurality of seed profiles for expanded audience profile selection.

17. The method of claim 16, wherein the one or more characteristics are used in a bidding strategy for available inventory.

* * * * *